(12) United States Patent
Sakamoto et al.

(10) Patent No.: US 6,185,544 B1
(45) Date of Patent: Feb. 6, 2001

(54) PROCESSING SYSTEM FOR CHARGE REQUEST DATA

(75) Inventors: Yoshitsugu Sakamoto; Shinsuke Kawahara; Kimio Handa; Hideto Nishizawa; Haruro Sato; Toshiyuki Furuya; Tsutomu Hosoi; Takashi Yamada; Fujio Wakabayashi, all of Tokyo (JP)

(73) Assignees: Shimizu Construction Co., Ltd.; NIT Data Corporation, both of Tokyo (JP)

( * ) Notice: Under 35 U.S.C. 154(b), the term of this patent shall be extended for 0 days.

(21) Appl. No.: 08/871,131

(22) Filed: Jun. 6, 1997

(30) Foreign Application Priority Data

Jun. 7, 1996 (JP) .................................................. 8-145301

(51) Int. Cl.[7] .................................................. G06F 17/60
(52) U.S. Cl. .................................................. 705/40; 705/39
(58) Field of Search .......................... 705/40, 39; 902/20, 902/21, 24

(56) References Cited

U.S. PATENT DOCUMENTS 5,649,117 * 7/1997 Landry .................................... 705/40

* cited by examiner

Primary Examiner—Allen R. MacDonald
Assistant Examiner—Penny Caudle
(74) Attorney, Agent, or Firm—Armstrong, Westerman, Hattori, McLeland & Naughton

(57) ABSTRACT

The processing system for charge request data of the present invention comprises data input means for inputting charge request data, including charge transfer day, requesting organization, paying organization and an amount of transfer, a master file where information relating to requesting organizations and paying organizations are registered, charge transfer processing means for preparing a charge transfer detailed file including individual charge request data where said charge request data are classified to each requesting organization based on said master file and summary data summarizing number of transfers and amount of transfer for each type of the requesting organization, and for preparing a transfer slip containing charge transfer information of each requesting organization for each paying organization from said charge transfer detailed file, initial cost data containing information necessary for processing for financial accounting, and overall charge transfer data on the day of transfer, and input/output means for displaying, printing and transmitting the data prepared by said charge transfer processing means and for inputting operation, and executes processing necessary for charge transfer for each paying organization by inputting the charge request data.

8 Claims, 13 Drawing Sheets

FIG. 3A

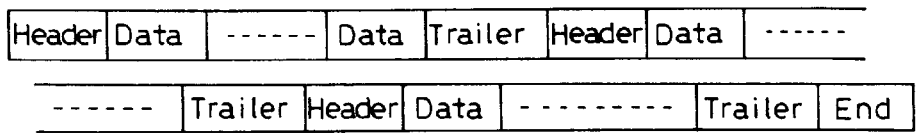

FIG. 3B

| Header record | Account |
| --- | --- |
| Data record | Day of transfer ; requesting organization ; paying organization ; amount of transfer |
| ⋮ | |
| Data record | |
| Trailer record | Total number of transfers; total amount of transfers; number of transfers for each type; amount of transfers |
| End record | Total number of records ; number of accounts |

FIG. 4A

| Day of transfer | |
| --- | --- |
| Requesting organization | |
| Paying organization | |
| Amount of transfers | |
| Day of transfer | |
| Requesting organization | |
| Paying organization | |

FIG. 4B

| Electricity | |
| --- | --- |
| Amount of transfers | |
| Number of transfers | |
| Gas | |
| Amount of transfers | |
| Number of transfers | |
| Telephone | |
| Amount of transfers | |

FIG.7(a)

| JULY 1, 1996 | TOKYO ELECTRIC POWER COMPANY | | | |
|---|---|---|---|---|
| ITEM OF ACCOUNT | ABBREVIATION | INITIAL COST CODE | AMOUNT | BANK ACCOUNT |
| TOKYO BRANCH | SHIBAURA BLDG. | 22-D-441 | 300,000 | TOKYO BRANCH AUTO-MATIC TRANSFER ACCOUNT |
| TOKYO BRANCH | EXTENDING CONSTRUCTION OF S BLDG. | 22-D-441 | 100,000 | TOKYO BRANCH AUTO-MATIC TRANSFER ACCOUNT |
| OPERATING EXPENSES | TAMACHI OFFICE | 214 | 50,000 | TOKYO BRANCH AUTO-MATIC TRANSFER ACCOUNT |
| TOTAL FOR TOKYO ELECTRIC POWER Co. | 43 ITEMS | | 9,850,120 | |
| JULY 1, 1996 | NTT (NIPPON TELEGRAPH AND TELEPHONE Co.) | | | |
| ITEM OF ACCOUNT | ABBREVIATION | INITIAL COST CODE | AMOUNT | BANK ACCOUNT |
| TOKYO BRANCH | KAIGAN BLDG. | 22-D-213 | 310,000 | TOKYO BRANCH AUTO-MATIC TRANSFER ACCOUNT |
| TOKYO BRANCH | EXTENDING CONSTRUCTION OF S BLDG. | 22-D-213 | 1,000 | TOKYO BRANCH AUTO-MATIC TRANSFER ACCOUNT |
| OPERATING EXPENSES | TAMACHI OFFICE | 214 | 25,000 | TOKYO BRANCH AUTO-MATIC TRANSFER ACCOUNT |
| TOKYO BRANCH | SHIBAURA BLDG. | 22-D-213 | 200,000 | TOKYO BRANCH AUTO-MATIC TRANSFER ACCOUNT |
| OPERATING EXPENSES | SHIBA OFFICE | 214 | △1,500 | TOKYO BRANCH AUTO-MATIC TRANSFER ACCOUNT |
| TOTAL FOR NTT (OF WHICH RE-DRAFT:1 ITEM △1,500) | 52 ITEMS 1 ITEM △1,500 | | 13,850,123 | |

FIG.7

| FIG.7(a) | FIG.7(b) |
|---|---|

FIG. 7(b)

| JULY 1, 1996 | TOKYO GAS COMPANY | | | |
|---|---|---|---|---|
| ITEM OF ACCOUNT | ABBREVIATION | INITIAL COST CODE | AMOUNT | BANK ACCOUNT |
| TOKYO BRANCH | KAIGAN BLDG. | 22-D-214 | 20,000 | TOKYO BRANCH AUTO-MATIC TRANSFER ACCOUNT |
| OPERATING EXPENSES | TAMACHI OFFICE | 214 | 35,000 | TOKYO BRANCH AUTO-MATIC TRANSFER ACCOUNT |
| TOKYO BRANCH | SHIBAURA BLDG. | 22-D-213 | 5,000 | TOKYO BRANCH AUTO-MATIC TRANSFER ACCOUNT |
| | TOTAL FOR TOKYO GAS Co. | 32 ITEMS | 950,320 | |

| | TOTAL FOR TOKYO BRANCH | 127 ITEMS | 24,650,563 |
|---|---|---|---|
| BREAKDOWN | TOTAL FOR TOKYO ELECTRIC | 43 ITEMS | 9,850,120 |
| | TOTAL FOR NTT | 52 ITEMS | 13,850,123 |
| | TOTAL FOR TOKYO GAS | 32 ITEMS | 950,320 |

FIG.15

| ACCOUNT NUMBER | | | REQUESTED AMOUNT ON DAY OF PAYMENT | | | | | |
|---|---|---|---|---|---|---|---|---|
| TYPE CODE | ORGANIZATION CODE | CONTRACTOR CODE | 1 | 2 | 3 | 4 | 30 | 31 |
| | | | | | | | | |
| | | | | | | | | |
| | | | | | | | | |
| | | | | | | | | |
| | | | | | | | | |
| | | | | | | | | |
| | | | | | | | | |
| | | | | | | | | |
| TOTAL TO BE WITHDRAWN | | | | | | | | |

PROCESSING SYSTEM FOR CHARGE REQUEST DATA

BACKGROUND OF THE INVENTION

The present invention relates to a processing for charge request data, by which it is possible to perform collective processing of charge request data including contractor information issued from a charge requesting organization and amount of charge, and to process said data for each account of a charge paying organization for each day of payment.

With rapid progress and propagation of cashless payment and automatic payment, fees or charges such as electric charges, telephone charges, gas charges, water charges, television subscription fee, etc. are now generally paid through automatic withdrawal from bank account of a user in case the user is a private person. To withdraw and pay these charges, each local office of the requesting organization (i.e. company or organization providing supply or services) checks meters and sends withdrawal data to each bank concerned and also issues detailed account statement to each user. Then, the user prepares ample sum of fund at the bank account, and the charges are withdrawn from the specified account and paid.

However, automatic transfer payment system of charges as described above is widely utilized only when the user is a private person, while it is not usually adopted in case of companies and other business enterprises. In particular, in case of large-scale companies having wide network of offices, stores, branch offices, or agencies all over the country, the above payment system is not adopted. As shown in FIG. 1, charges are mostly paid against a payment slip issued by a company which provides supply or services. This is because it is generally the accounting principle of business enterprises to pay the charge after confirmation, i.e. to pay the charge after receipt of a bill and after confirming the details of the request and the amount of charge. More concretely, automatic withdrawal system from bank account, in which payment is confirmed after charge has been paid, is not suitable for business practices. Also, because the date of withdrawal of the charge and the amount of the charge are not confirmed in advance, the business firms are not always prepared to keep enough fund in daily cash flow of the business and there may be much waste or loss of fund to always keep a certain amount of fund at the account.

For this reason, if it is supposed, for example, that charges must be paid each month to 4 companies in average at a local office in case of a business firm, which has 3,500 bases (local offices) all over the country, 168,000 pieces of payment slips must be processed each year. Also, 6–8 payment slips are to be processed for each local office each month, including 2 slips for electric charges (high voltage and low voltage), 3–5 slips for telephone charges, including facsimile, portable telephone, etc., and 1 slip for water charge. Further, if it is supposed that there are 9 electric power companies, 12 telephone companies, 100 gas companies, 800 water supply companies all over the country, there are 921 companies in all which are collecting public utility charges. When the payment of charges such as payment to local self-governing bodies (fixed property tax, city planning tax, and automobile tax), television subscription fee, newspaper subscription fee, lease fee, land or house rent, various membership fees, etc. are included, the amounts of the charges to be processed are really enormous. On the other hand, in case of a mobile type enterprise, which installs local construction offices only during the period of construction of a building, commercial dealings are changed almost daily due to new installation or shifting of local offices. In such case, the management of charge processing is more complicated, and field account settlement principle is adopted. If these local transactions are collectively processed at a center, there are so many numbers and types of charge requesting organizations, and it is difficult to adequately process the charge payment. The procedure to check the amount of cash withdrawal from the bank account is as complicated as the case of the payment against payment slips. In the post-processing type automatic transfer account system proposed by the bank, there is limitation in capacity. In addition to the situations as described above, considerable time is required to take the procedure to switch over to automatic withdrawal and payment system. Automatic withdrawal and payment are performed in some cases, while the payment against payment slips is adopted in some other cases. In general, charge payment processing is now very complicated and troublesome in case of large-scale business enterprises.

SUMMARY OF THE INVENTION

To solve the above problems, it is an object of the present invention to provide a processing system, by which it is possible even for a business enterprise having many local offices and bases to simplify transfer processing of charges and fees, to eliminate waste and loss in fund operation, and to attain labor-saving effect in business transactions.

To attain the above object, the processing system for charge request data according to the present invention inputs charge request data including data such as charge transfer day, requesting organization, paying organization, and amount of transfer. And, the processing system includes data input means for inputting said charge request data, a master file where information relating to requesting organizations and paying organizations are registered, charge transfer processing means, and input/output means. The charge transfer processing means prepares transfer detailed file including individual charge request data, where said charge request data are classified to each requesting organization based on said master file, and summary data, summarizing number of transfers and amount of transfer for each type of the requesting organization. The charge transfer processing means also prepares a transfer slip containing charge transfer information of each requesting organization for each paying organization from said charge transfer detailed file, initial cost data containing information necessary for processing for financial accounting, and overall charge transfer data on the day of transfer. The input/output means displays, prints, and transmits the data prepared by said charge transfer processing means and for inputting operation.

Also, the processing system for charge request data according to the present invention performs collective processing of the request data including contractor number and amount of request issued from a charge requesting organization for each day of payment and for each account of a charge paying organization, and said system comprises filter means for extracting a contractor number of the paying organization from a contractor number of the request data issued from said requesting organization, and request data processing means for preparing request data for each day of payment including contractor number of said paying organization and an amount of request for each paying organization, each type of charge, each requesting organization and each contractor.

Still other objects and advantages to the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is an arrangement example of charge request data;

FIG. 4 shows an arrangement example of a charge transfer detailed file;

FIG. 7 represents examples of transfer slips;

FIG. 15 shows an arrangement example of data file for payment day management to be used in the issuance of the request data for each day of payment.

DESCRIPTION OF THE PREFERRED EMBODIMENTS

Figure 1:
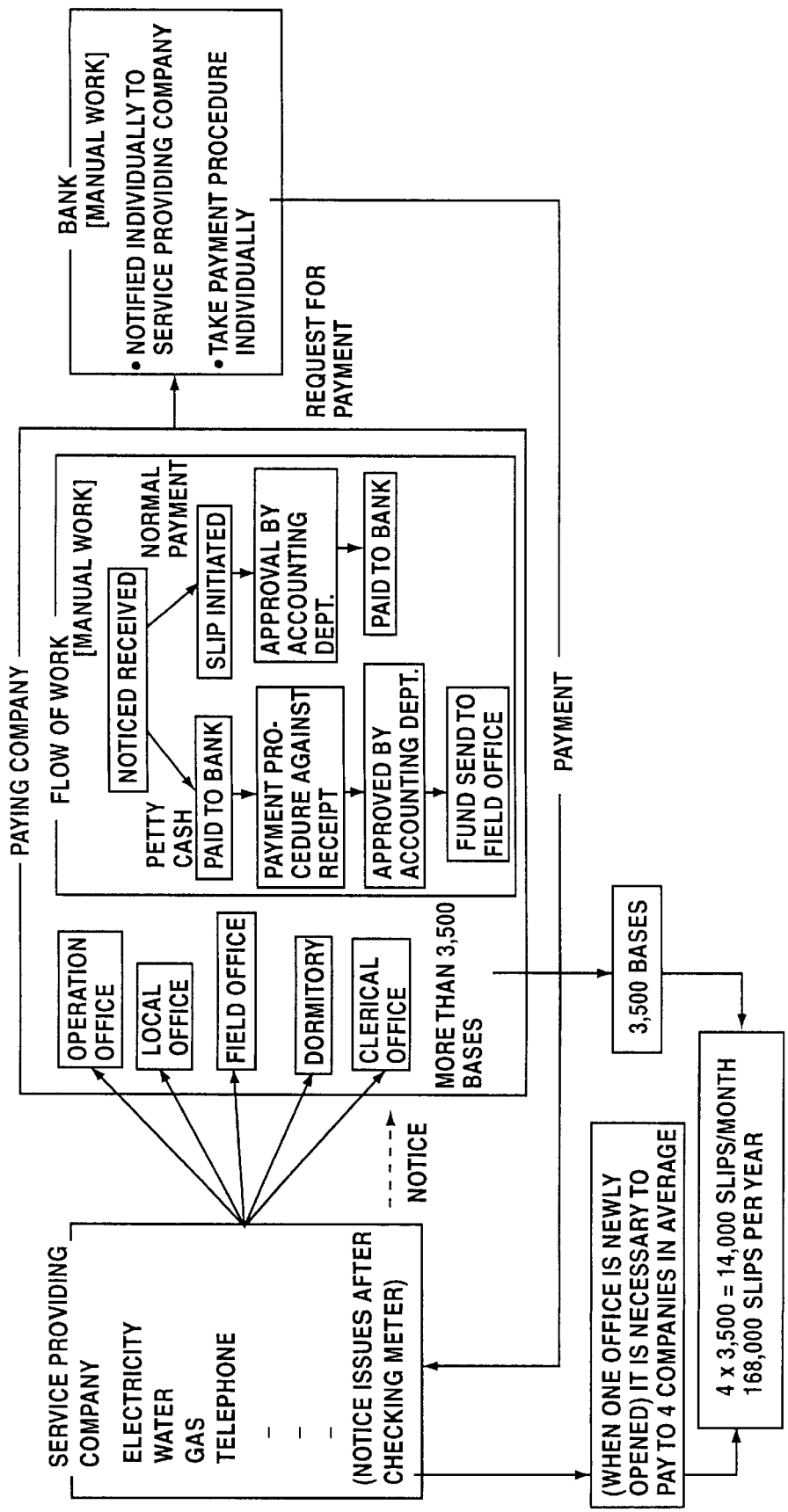
FIG. 1 is a drawing for explaining an example of a conventional system for paying public utility charges.
Figure 2:
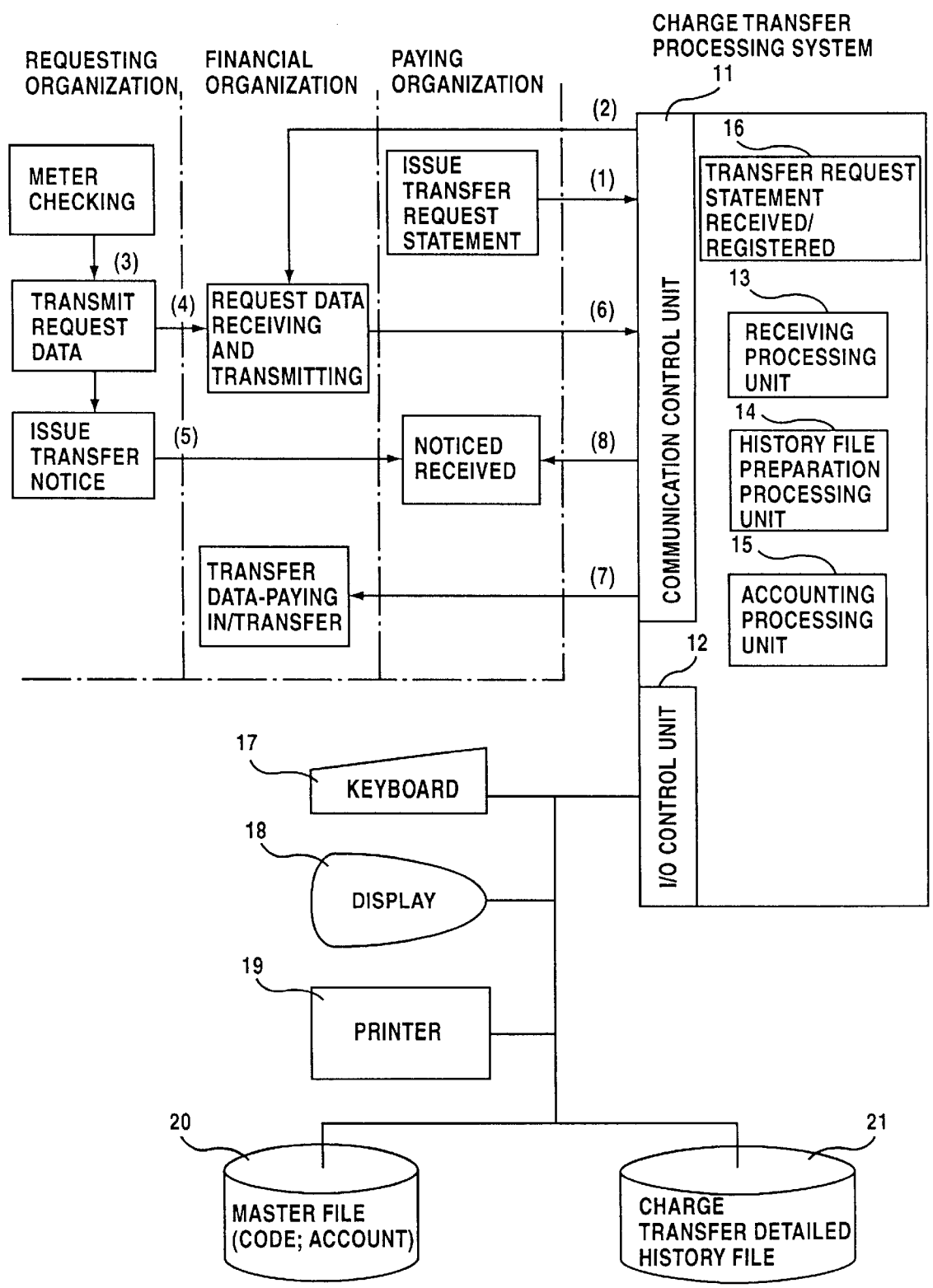
FIG. 2 is a block diagram showing an embodiment of a processing system of charge request data according to the present invention.

The processing system for charge request data according to the present invention performs processing of data upon receipt of a notice on the request data or the transfer data for each day of payment from a financial organization, and the processing system comprises steps and elements of processing as shown in FIG. 2.

In FIG. 2, a communication control unit 11 performs information communication to and from local bases or offices of financial organizations and paying organizations. Charge request data (6) from financial organization or data of transfer request statement (1) from paying organizations are received, or data (2) of the requesting organizations and the paying organization registered by the transfer request statement of the financial organization or transfer data (7) are transmitted or confirmation slip data (8) are transmitted to the paying organization. Of course, these data may be given or received using storage medium or may be inputted or outputted to or from paper via keyboard or printer. An I/O control unit 12 controls input/output of devices on elements including a pointing device such as mouse for operation input or a keyboard 17, a display 18 for display output, a printer 19 for printing, a master file 20 for storing master data as an external storage unit, and a charge transfer detailed history file to store detailed charge transfer history data. Naturally, the files may be stored in an internal storage memory.

A receiving processing unit 13 receives and processes charge request data from financial organization, and the charge request data comprises various types of information such as transfer account, day of transfer, requesting organization, paying organization and amount of money transfer. When the charge request data is received at the receiving and processing unit 13, the data are divided into individual charge request data for each requesting organization based on the data registered in the master file 20 and checked, and a detailed charge transfer file is prepared. The detailed charge transfer file comprises individual charge request data and summary data, which summarizes number of transfers and amount of transfer for each type of the requesting organizations.

Here, the requesting organizations are local offices of service providing companies relating to the charges (such as electric power company, gas company, water supply company, telephone company or broadcasting company) and have various types of information for each business unit such as normal meter inspection, issuance of transfer notice, and each branch office and agency can be identified in this information. For example, it is indicated in charge code, or receiving organization code. The paying organizations are the offices, which receive supply or services such as electricity, gas, water, telephone, broadcasting, etc., and are indicated by customer numbers, for example. Therefore, the individual charge request data comprises the following information: for example, to which account the charge is to be transferred and when, or for which of electricity, gas, water, telephone, or broadcasting the charge is to be paid, or for which office the charge is requested, or which office has received supply or services, and how much is the charge.

The master file 20 registers master data, which comprises information relating to requesting organizations and paying organizations and the accounts, from which the charges are to be paid. When necessary, information relating to companies providing service or supply such as electricity, gas, water, telephone, broadcasting, etc., retrieved by the requesting organizations or the paying organizations are registered. Alternatively, the information such as head office, local office, address, abbreviation, item of account, etc. are registered. The master file is used to collate the requesting organizations or paying organizations registered as master data and for preparing transfer slips and initial cost data.

A charge transfer detailed history file preparation processing unit 14 checks presence or absence of individual charge request data other than the paying organizations registered in the master file 20 from the individual charge request data stored in the charge transfer detailed file. Unregistered data are separated from the registered data, for example, as unsettled temporary payment processing, and the charge transfer detailed history file 21 is prepared from these data. Further, summary processing for each classified paying organizations and accounts is performed.

An accounting processing unit 15 prepares transfer slips comprising charge transfer information of each requesting organization for each paying organization from the charge transfer detailed history file 21. The transfer slips include charge transfer information of each requesting organization for each paying organization classified for each of head office, branch office or agency; initial cost data comprising information necessary for processing of financial accounting to be recorded at a specific item of account by accounting processing; and overall charge transfer data on the day of transfer. The transfer slips are prepared to confirm and approve at each field office, head office or branch office on the charge request data. The initial cost data are prepared to carry out a predetermined processing in business accounting. The overall charge transfer data are the data to transfer fund from deposit account of the fund department to the transfer account and to prepare the fund corresponding to the amount of transfer to the transfer account. The overall charge transfer data are submitted to financial organizations.

A transfer request receiving/registration processing unit 16 performs processing to register or to delete master data in the master file 20 when an account for charge transfer is opened or closed due to opening or closing of a local office. In general, opening or closing of an account for charge transfer is processed according to the transfer request statement from the local office concerned, and this information is notified to the financial organization. Upon receipt of the transfer data from the requesting organization, individual charge request data is prepared according to this information. However, in case there is discrepancy between the information of the financial organization and the master data in the master file 20, or in case there has been an error in input operation, unsettled temporary payment processing is performed at the charge transfer detailed history file preparation processing unit 14 as already explained.

To explain flow of general processing including the requesting organization, which provides supply or services, when a new local office is opened, for example, a transfer request statement of the charges such as electric charge or telephone charge, etc. which are to be paid by the local office is prepared (1). Based on the transfer request statement, the information necessary for the management including requesting organizations or paying organizations of the charge such as electric charge, telephone charge, account, day of transfer, and further address, name, item of account, etc. are registered as master data in the master file 20 in the processing system for charge request data, and the details of the information are notified to the financial organization (2). The requesting organization inspects meter periodically and prepares transfer data (3) and sends it to the financial organization (4), and issues a transfer notice to the paying organization, for which the meter has been checked (5). In response to this, upon receipt of the transfer data from the requesting organization, for example, not later than two business days before the specified day, the financial organization prepares charge request data one business day before the day of payment, and transmits the data to the processing system of charge request data (6). The processing system for charge request data prepares a transfer slip upon receipt of the charge request data, confirms and approves the charge request data, prepares initial cost data and carries out account processing. Then, overall transfer data is transmitted to the financial organization and the fund is supplied (transfer deposit) (7). Then, a slip is sent to the paying organization to collate and check the data with the transfer notice (8).

Next, description will be given on concrete arrangement examples of data structure referring to FIG. 3 to FIG. 7.

The format of the charge request data (6), which the receiving processing unit 13 receives from the financial organization, comprises, for example as shown in FIG. 3A, a header record, a data record, a trailer record, and an end record, and there are a plurality of data between the header record and the trailer record, and these constitute one data group. A plurality of data groups continue further, and these are completed with an end record. As shown in FIG. 3B, the header record comprises information of accounts of the subsequent data groups. More concretely, it comprises, for example, type code, day of transfer (from . . . to . . . ), bank code, bank name, branch office code, branch office name, type of deposit, account number, account name, etc. The data record comprises various types of information such as day of transfer, requesting organization, paying organization, and amount of transfer. More concretely, it comprises, for example, day of transfer, charge code, receiving organization code, receiving organization name, amount of transfer, customer number, etc. The trailer record comprises information such as total number of transfers summarized, number of transfers for each type of charge such as electricity, gas, water, telephone, broadcasting, etc., and amount of transfer. The end record comprises total number of records and number of accounts. Therefore, each of the data records basically represents electric charge (high voltage), electric charge (low voltage), water charge, etc. of a local office A, and transfer charge of a local office having unified account comprises a plurality of data records after the header record.

In the receiving processing, header record, data record, trailer record, and end record are separated in the editing of the received data, and error check is performed such as numeric check on day of transfer and amount of transfer, code master check such as checking of charge code to indicate the requesting organization or the code of the receiving organization, or checking of total number of data, total amount of the charges, total number of trailer records, and checking of coordination based on comparison of total amount. If there is an error, the detailed charge transfer check list is outputted, and the charge transfer detailed file is prepared.

As shown in FIG. 4A, the charge transfer detailed file comprises individual charge request data including day of transfer, requesting organization, paying organization, and amount of transfer, and summary data which summarizes amount of transfer and number of transfers for each type of requesting organization of the charges such as electricity gas, etc. More concretely, it comprises charge code, receiving organization code, customer number, amount of transfer, and data of amount of transfer and number of transfers on the charges of gas, telephone, broadcasting, electricity, water, etc.

Figure 5:
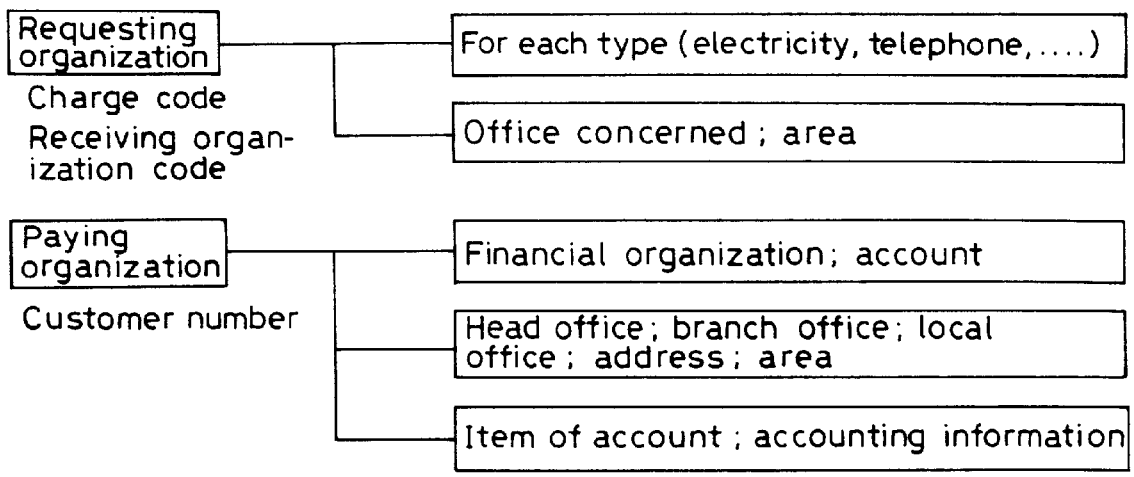
FIG. 5 is a drawing for explaining information of a requesting organization and a paying organization.
Figure 6:
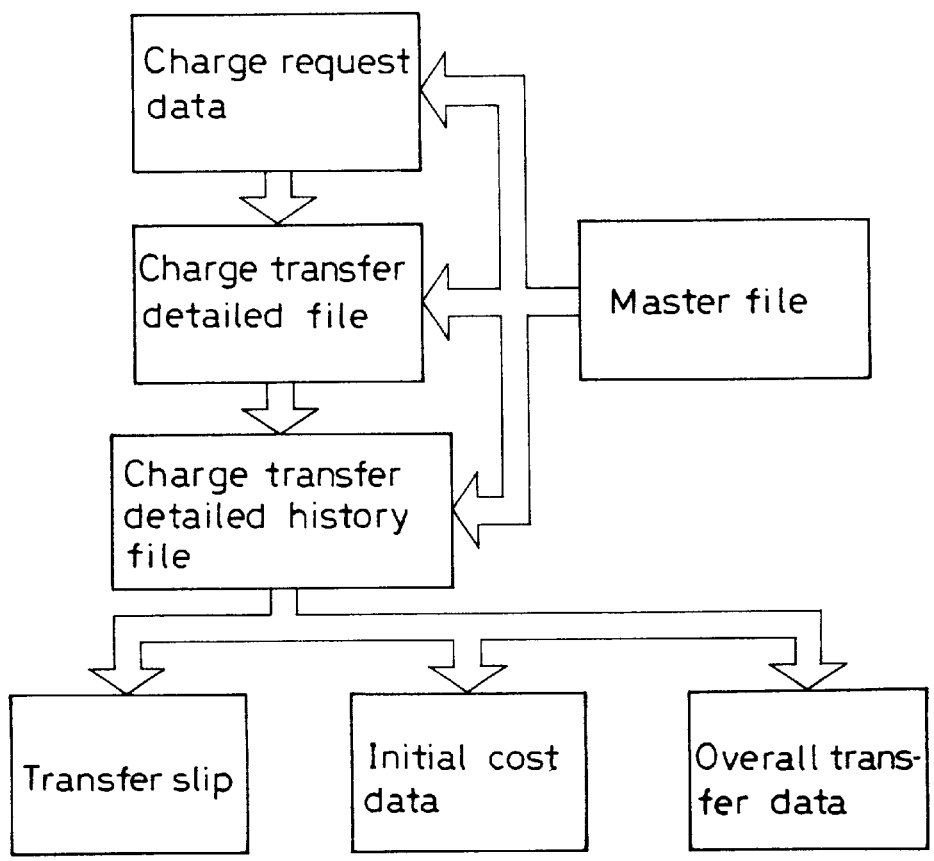
FIG. 6 is a flow chart showing flow of each file and data prepared from the charge request data.

As shown in FIG. 5, the requesting organizations are indicated, for example, by charge code or receiving organization code, and these have different codes for each type of charges such as electricity, telephone, etc. or for each local office, area, etc. The paying organizations are indicated, for example, by customer number, and it differs according to each financial organization, account, head office or branch office, local office, area, item of account, accounting information, etc. By registering the information to correspond to the customer number as master data, it is possible to sum up charges for each of head office, branch office, local office, area, etc. or to prepare transfer slip, initial cost data, and overall transfer data. The relationship of these data are summarized in FIG. 6, and FIG. 7 shows examples of transfer slips.

As already explained, according to the system of the present invention, charge request data is received and charge transfer detailed file is prepared, and this is accumulated in the charge transfer detailed history file. Like the charge request data or the charge transfer detailed file explained in connection with FIG. 3 and FIG. 4, in the charge transfer detailed history file, head office or branch office code in abbreviation, item of account, abbreviation code, etc. are added, by referring to the master file, to the data such as day of transfer, charge code, receiving organization code, customer number, and amount of transfer. The transfer slip prepared according to these data summarizes the information such as item of account, abbreviation, initial cost code, amount of money, bank account, etc. for each of head office and branch offices as shown in FIG. 7.

Next, description will be given on flow of processing by the processing system for charge request data referring to FIG. 8 to FIG. 10.

Figure 8:
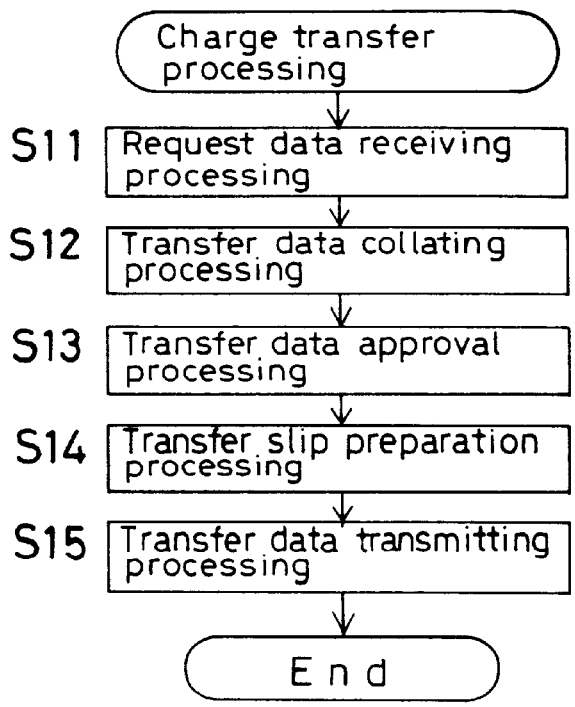
FIG. 8 is a flow chart to show flow of overall processing by the processing system for charge request data.

In the processing system for charge request data of the present invention, when charge request data (transfer data) is transmitted not later than one business day before the specified day, for example, from the financial organization as shown in FIG. 8, the data are incorporated via the communication control unit. Then, editing and error check are performed on the received data, and a detailed charge transfer file is prepared, and a detailed charge transfer check list is outputted (receiving processing of the charge request data; Step S11). By collating and checking the transfer data with the master file, a charge transfer detailed history file is prepared (Step S12). Next, the transfer data approving processing is performed (Step S13). In this transfer data approving processing, to confirm amount of transfer and number of transfers in the transfer data on the next business day, day of transfer, name of branch office, amount of transfer, and number of transfers are displayed on screen, and a charge account fund supply request statement is printed out, which comprises day of transfer, name of branch office, amount of transfer, number of transfers, bank data (such as branch office name, type of account, account number/name), and transfer number. This is to be sent to the fund department to maintain supply of fund. Next, by the transfer slip preparation processing, a transfer slip is prepared for each local office or head office or branch office, and initial cost data to financial accounting system is prepared, and the transfer data is confirmed (Step S14). By the transfer data transmitting processing, the data for transfer on the next day is extracted from the charge transfer detailed history file, and overall transfer data is prepared, and this is sent to the financial organization (Step S15). The overall transfer data comprises, for example, the information such as type code, day of engagement, outward bank data (outward bank code, outward bank name, outward branch office code, outward branch office name, type of deposit, account number), inward bank data (inward bank code, inward bank name, inward branch office code, inward branch office name, type of deposit, account number, amount of transfer), type of telegram, etc.

Figure 9:
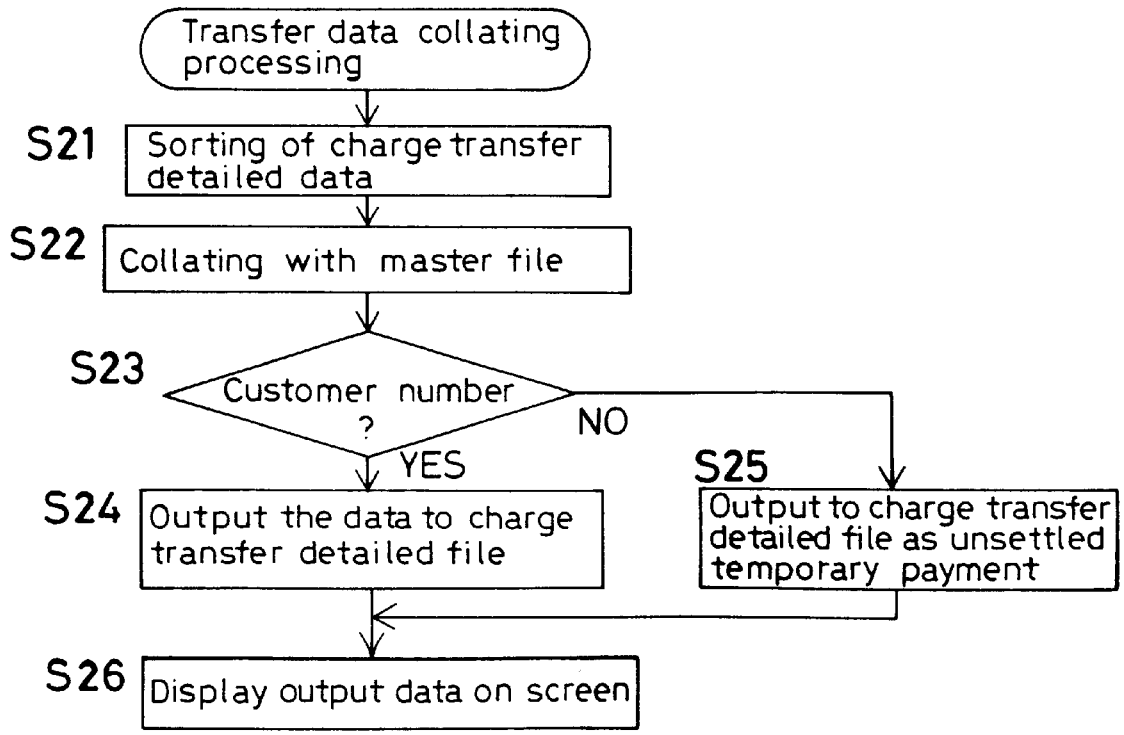
FIG. 9 is a flow chart to explain an example of collating processing to collate the transfer data.

In the transfer data collating processing, for example, customer numbers in the charge transfer detailed file are sorted as shown in FIG. 9 (Step S21), and the data are collated with those of the master file (Step S22). Then, it is checked whether the customer number in the charge transfer detailed file is present in the master file or not (Step S23). If the customer number is present in the master file, the data is outputted to the charge transfer detailed history file (Step S24). If the customer number in not present, it is outputted to the charge transfer detailed history file as unsettled temporary payment (Step S25). Then, summary data such as type of transfer account for each branch office, amount of transfer and number of transfers are displayed on the display screen as the information for confirmation (Step S26).

Figure 10:
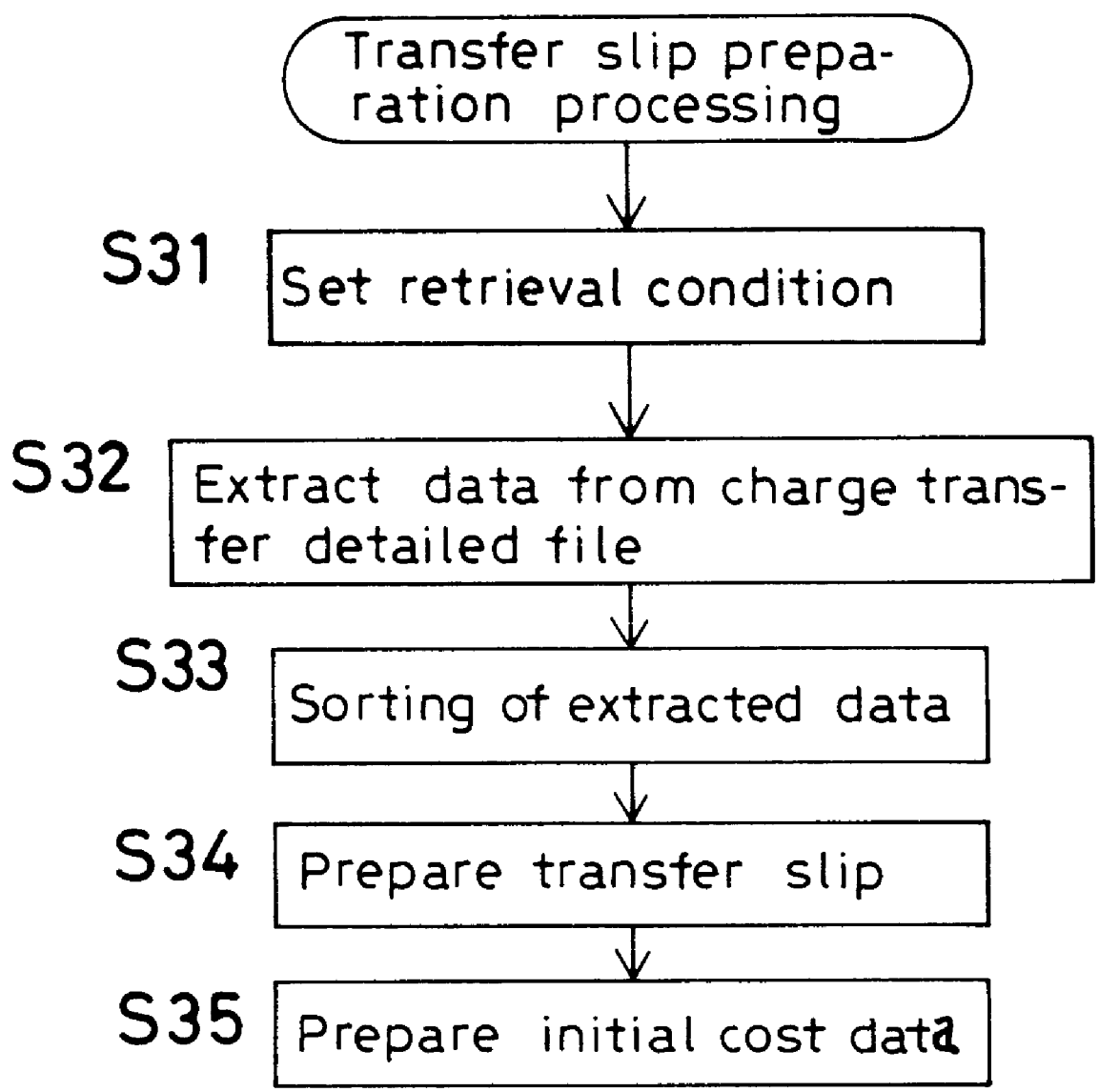
FIG. 10 is a flow chart to explain an example of a processing to prepare transfer slip.

In the transfer slip preparation processing, as shown in FIG. 10, for example, the data such as branch office and the next business day of transfer are set as retrieval condition (Step S31), and the data are extracted from the charge transfer detailed history file (Step S32). Next, charge code, receiving organization code, and abbreviation code are sorted in the ascending order (Step S33), and a transfer slip is prepared (Step S34). Further, initial cost data to the financial accounting system is prepared (Step S35). The transfer slip comprises, for example, the data such as day of transfer, accounting slip number, item of account, specific item (abbreviation name), classification of cost (symbols, elements, items of cost), amount of transfer, receiving organization name, etc., and these are prepared for each type of charge and for each of head office or branch office. The initial cost data comprises the items such as head office or branch office code, trial calculation number, slip number, item of account code, abbreviation code, classification of initial cost (symbols, elements, items of cost), amount of transfer, classification of non-taxed or taxed.

Next, description will be given on another embodiment of the present invention, which comprises a filter processing unit to extract and convert the contractor code, referring to FIG. 11 and FIG. 12.

Figure 11:
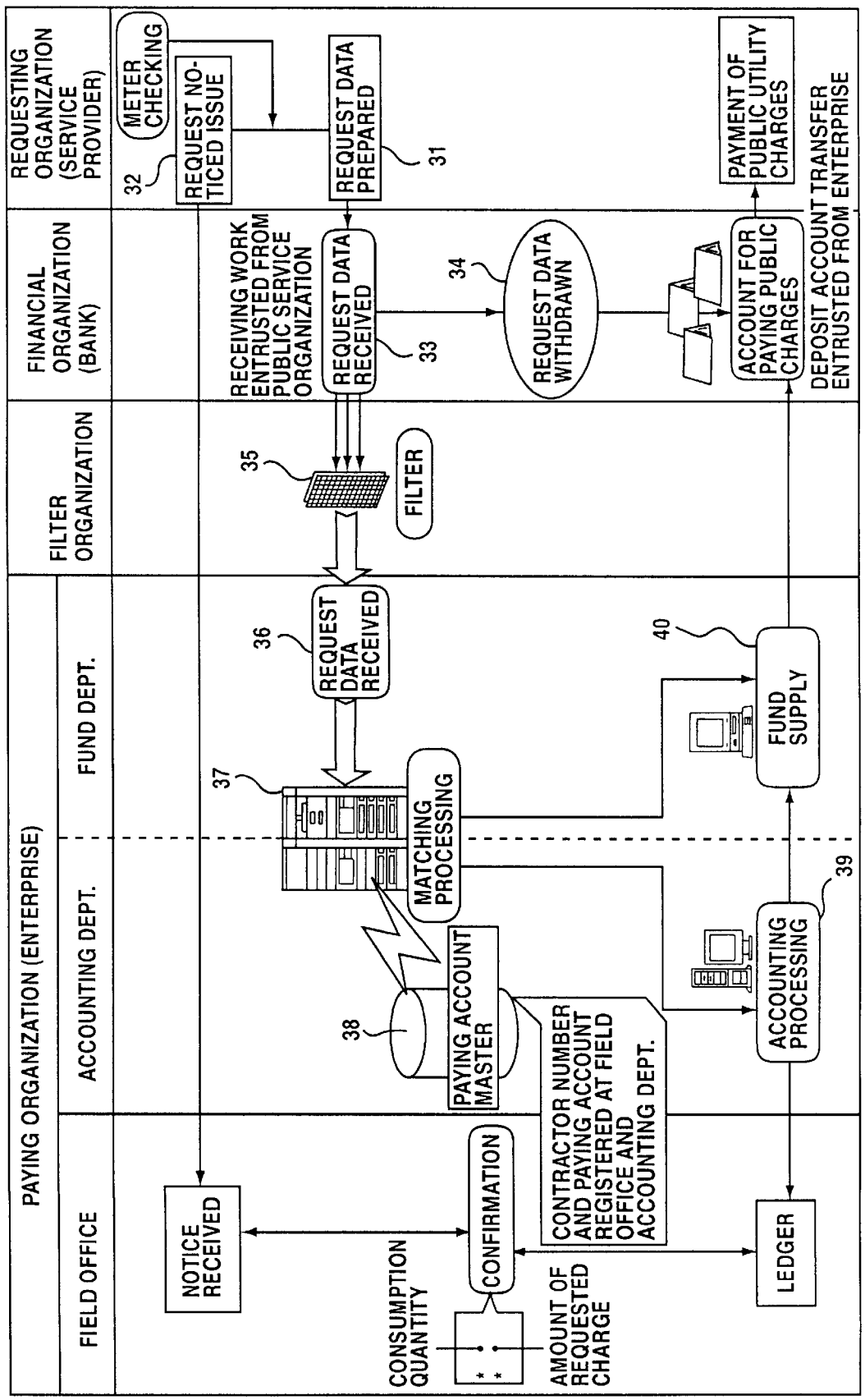
FIG. 11 is a drawing to show flow of processing of the charge request data according to the present invention.

In FIG. 11, a request data receiving unit 33 receives the request data from the requesting organization (service provider) and processes the data for each type of services such as electricity, gas, telephone, water, etc. and organization for each type of charge (e.g. electric power companies A, B or C in case of electricity), and for each contractor. The request data comprises, for example, meter number, telephone number, etc. and contractor code registered by the company, while the request data to be processed by the filter processing unit 35 comprises service providing company (requesting organization) not related to the contractor code registered by the company or additional management information of a bank (financial organization) (e.g. information such as day of request, number of requests, ledger number, page number, area, address and local office). Moreover, the positions of these data are different according to each service providing company or bank. That is, the format of the data including contractor code differs according to each service providing company and bank. The filter processing unit 35 reads the contractor code necessary for the company (paying organization) from the request data including contractor code of the format specific to the service providing company and the bank. In a paying account master 38, data of the paying account in the account processing of the paying organization, e.g. item of accounting, specific item, initial cost code, etc. are stored for each contractor code, and these are registered in advance by the accounting department, for example. The matching processing unit 37 matches the contractor code of the request data with the paying account master 38 and prepares a transfer list or a transfer slip necessary for accounting processing of the request data.

Next, the flow of the entire system is described. First, the service providing company identifies the consumption quantity by means such as meter checking and prepares charge request data by the request data preparation processing unit 31 and issues a request notice from the request notice issuance processing unit 32. This request data may be brought, for example, to the business center of a bank as magnetic data.

Upon receipt of the request data brought from the request data receiving unit 33, the bank extracts the request data for each company and notifies the request data (request data for each day of payment) by summarizing the data for each day of payment prior to the day of payment (not later than one business day before). In a filter organization, contractor code is read from the request data including the contractor code of the format specific to the request data for each day of payment from the filter processing unit 35 and it is converted to contractor code already registered in the company.

In the company, matching of the contractor code of the request data with the paying account master is performed by the matching processing unit 37. Then, transfer list and transfer slip are initiated, and accounting processing 39 and fund supply 40 are carried out. On the other hand, the bank withdraws 34 an amount of the request data for each day of payment from the account of the company on the day of payment and transfers it to the service providing company. At the local office of the company, i.e. the paying company, a request notice is already issued before the charge request data is prepared by the service providing company, and the consumption quantity and the amount of the charge are checked. If an error is found in numerical value, the correction of the request data is requested to the service providing company.

Figure 12:
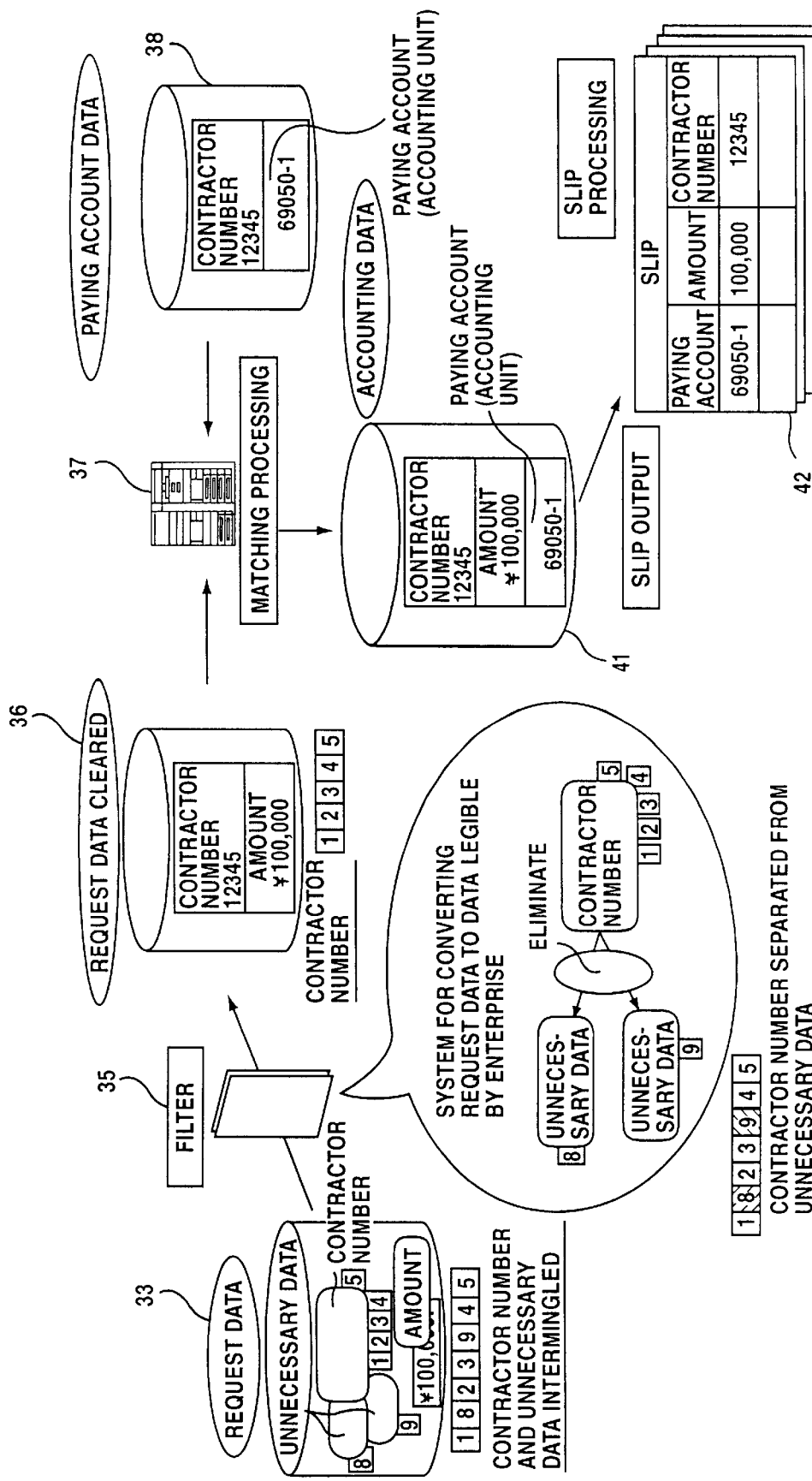
FIG. 12 is a drawing to explain filter processing and matching processing of the request data.

FIG. 12 represents concrete examples of filter processing and matching processing of the request data. In the filter processing unit 35, it is set in advance in such manner that 2nd and 5th digits from above in the data of the contractor number are unnecessary data as the format of the data and the remaining data should be read as the contractor number. On the other hand, in the paying account master 38, a number "69050-1" is registered as the paying account (accounting unit) to the contractor number "12345". Then, as shown in FIG. 12, for example, a request data comprises a number "1823945", i.e. the contractor number "12345" added with unnecessary data not related to the contractor number (e.g. "8" representing the day of request, and "9" representing number of requests) and an amount of requested charge. If this request data is inputted, the filter processing unit 35 reads the contractor number of "12345" from the data of "1823945" by filter processing and sends the contractor number and the amount of requested charge to the matching processing unit 37. In this way, the information specific to the service providing company or the bank and having no value to the paying company is exempted in the contractor number, and it is the information corresponding to identification number used in the processing in the company. The matching processing unit 37 performs matching with the paying account master 38 by the contractor number of "12345" and reads the paying account (accounting unit) "69050-1". Then, accounting data 41 comprising contractor number, amount of requested charge, and paying account is generated, and a desired transfer slip 42 is outputted by slip processing based on these data.

Figure 13:
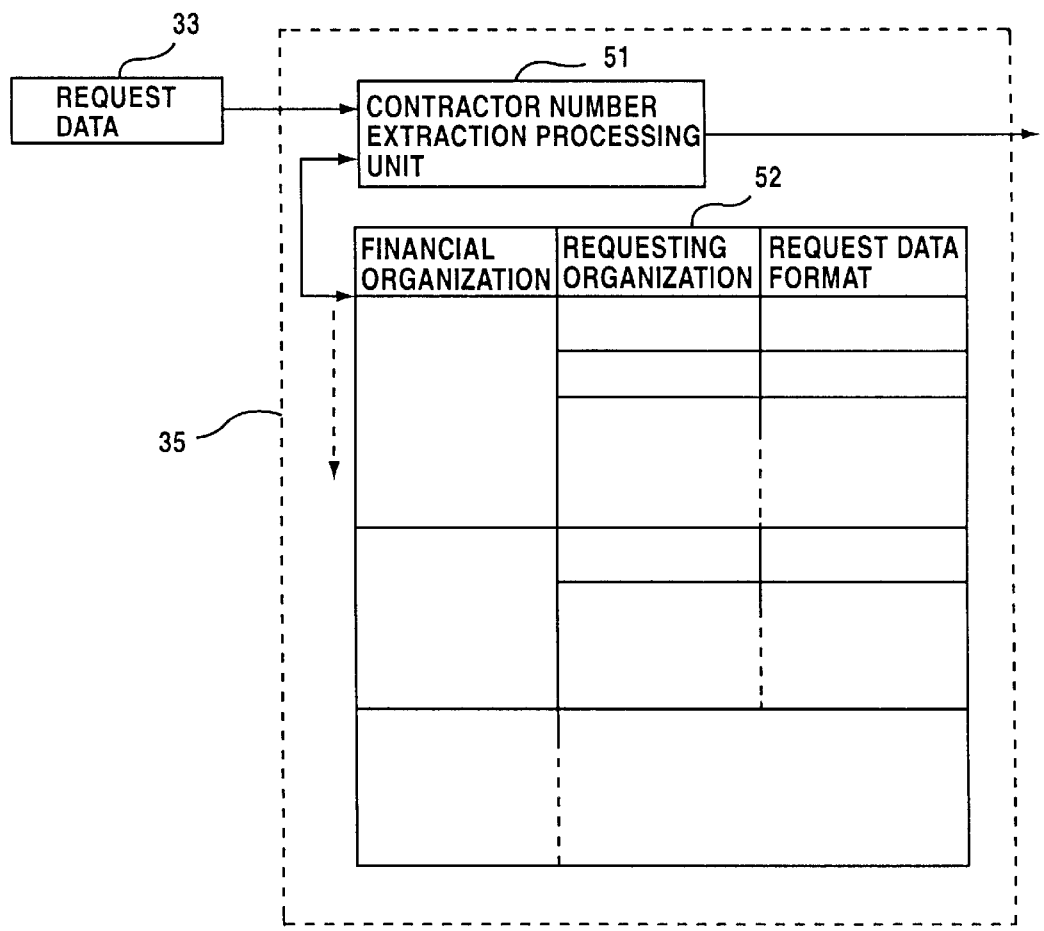
FIG. 13 shows a concrete arrangement example of a filter processing unit.

The filter processing unit 35 may comprise, for example as shown in FIG. 13, a contractor code extraction processing unit 51 and a contractor code extraction table 52. In this case, a request data format is registered for each financial organization and each requesting organization on the contractor code extraction table 52. In the contractor code extraction table 52, for example, a number "0" is set at the position of unnecessary data, and a number "1" is set at the position of the contractor code. When the request data 33 is inputted, the contractor code extraction processing unit 51 identifies the financial organization and the requesting organization, and by referring to the corresponding request data format, the data at the position of "0" is eliminated as unnecessary data, and only the data at the position of "1" is incorporated, and the contractor code is read.

Figure 14:
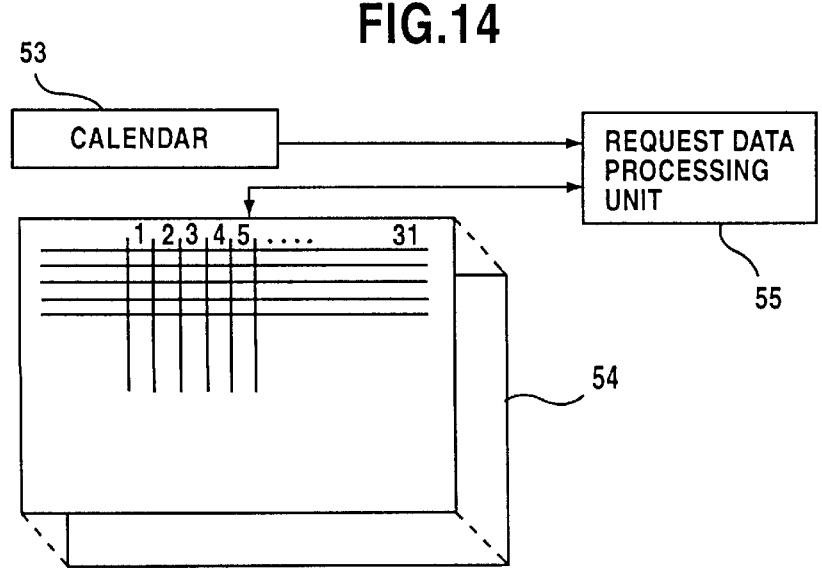
FIG. 14 shows an arrangement example of an issuing unit of the request data for each day of payment executed at the receipt of the request data.

The issuance processing unit of the request data for each day of payment may comprise, for example as shown in FIG. 14, a calendar 53, a day of payment management data file 54, and a request data processing unit 55. Here, in the day of payment management data file 54, amount of requested charge for each contractor code and for each day of payment is written for each account number as shown in FIG. 15. Upon receipt of the request data from the service providing company (requesting organization), the request data processing unit 55 writes the amount of requested charge in the column of the day of payment, and at the start-up of the system each morning, for example, the amount of the requested charge of each contractor code is read one business day before the day of payment with the calendar 53 as reference, and the request data is issued for each day of payment. In this case, a total column may be provided for each type and for each organization to sum up and the total sum may be obtained. Or, the amount of the requested charge may be cleared when the request data for each day of payment is issued. Further, one business day before the day of payment, i.e. on each day after the next business day, all of the request data for each day of payment may be prepared when necessary.

Figure 16:
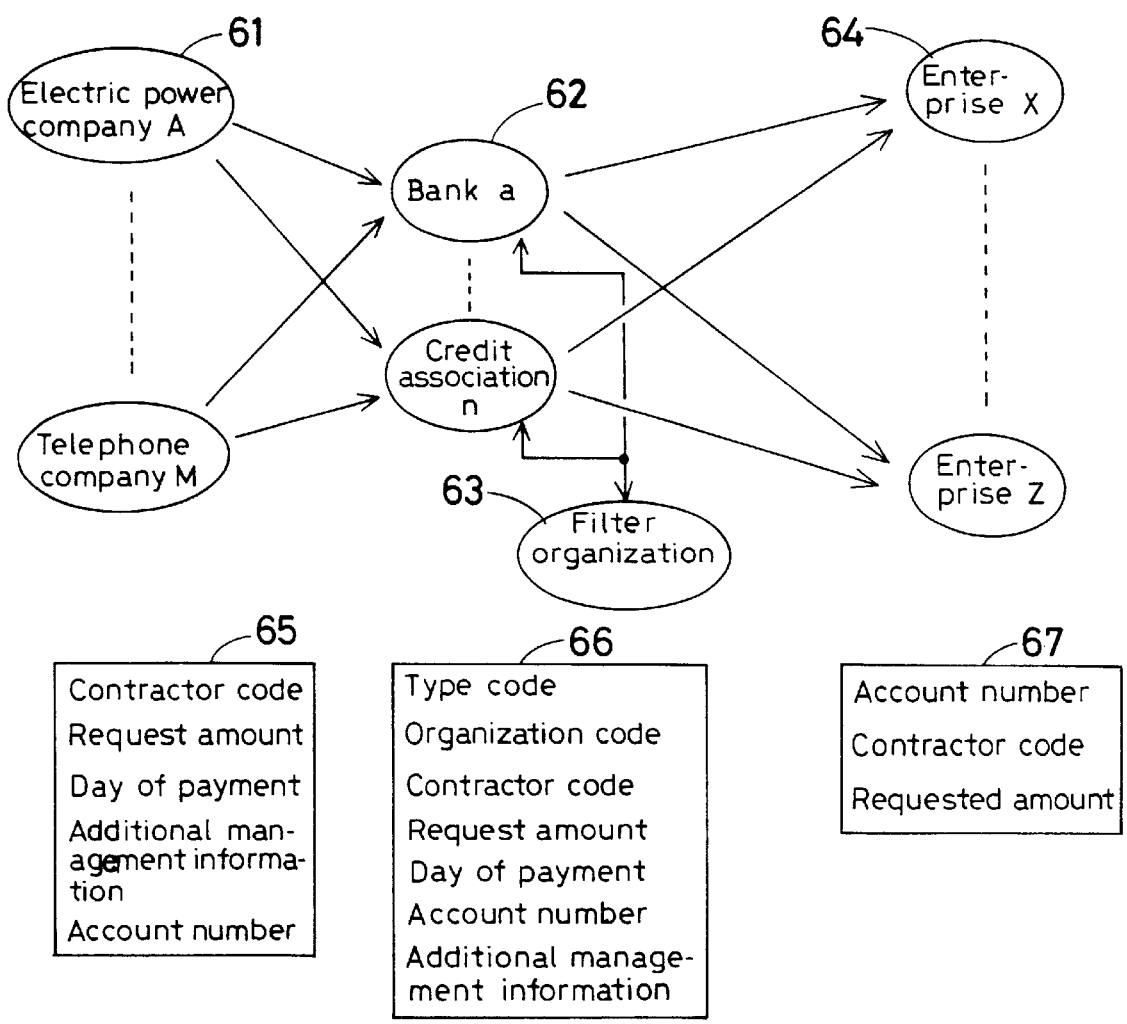
FIG. 16 shows an outline of the system, which comprises a plurality of requesting organizations, financial organizations and paying organizations.

FIG. 16 schematically illustrates outline of the system, which comprises a plurality of the requesting organizations, the financial organizations and the paying organizations. In FIG. 16, the requesting organizations 61 comprise, for example, the electric power company A . . . , the telephone company M, etc. The financial organizations 62 comprise, for example, the bank a, . . . , the credit association n. The paying organizations 64 comprise the company X, . . . , the company Z. The requesting organizations 61 bring the request data (transfer data) 65, which comprise contractor code, amount of requested charge, day of payment (day of transfer), additional management information, and transfer account, to the financial organization 62. Then, the financial organization 62 adds charge type code, organization code, account to withdraw, additional management information, etc. and places the request data 66 under control. Then, the filter organization 63 is provided as a common center in the financial organization 62, and by the filter processing, the request data 67 for each day of payment is notified to the paying organization 64 one business day before the day of payment.

The system of the present invention is not limited to the above embodiments, and various changes and modifications can be made. For example, in the above embodiments, description has been given on transfer processing of public utility charges, while the system may be applied to the transfer of other types of charges. Further, description has been given on the case where the request data for each day of payment is prepared one business day before the day of payment, while all request data for each day of payment may be prepared and outputted on any day after the next business day. It is needless to say that items, names, etc. in each data and file may be adequately changed according to the business details or accounting system or other conditions. Also, while the charge request data are received and overall transfer data are transmitted, processing data for display output or printing may be adequately changed according to the management system of the company. As the processing system of charge request data, a plurality of terminals for operation input, data display and printing of processed data may be connected using LAN or other means and may be provided in the sections or department in charge such as accounting department or fund department.

As it is evident from the above description, according to the present invention, contractor number is extracted from position information of contractor number of the request data issued from each requesting organization, and an amount of requested charge on the day of payment corresponding to the time of issuance of the request data from the charge requesting organization is stored in the data file where type of charge, amount of requested charge for each contractor and each day of payment are stored, and the request data for each day of payment is prepared one business day before the day of payment according to calendar. Accordingly, it is possible to perform collective processing of various types of charges all over the country based on the contractor number in each company.

Also, according to the present invention, charge request data comprising the data such as charge transfer day, requesting organization, paying organization, and amount of transfer are inputted and necessary processing is carried out on the charge transfer, and transfer slip, initial cost data and overall charge transfer data are prepared and outputted. Thus, it is possible to reduce the burden on each local office, agency, etc. Moreover, the payment can be made on the specified day of payment, and there is no need to pay the interest of the sum, which must be paid because the deposit must be kept for a while when payment is made before the specified day of payment. Also, it is possible to eliminate payment of arrearages because the payment is not delayed. Thus, additional cost in case of charge payment can be reduced. Further, there is no need to use payment slips and this can extensively reduce the number of slips, and space for storage of papers and documents can be reduced and it also contributes to the promotion of paperless business processing. On the other hand, for the financial organizations, labor-saving effect and increase of profit from transfer fee can be attained because the payment is exclusively made through the account transfer, and the service providing companies can also save labor and time.

What is claimed is:

1. A processing system for processing of charge request data, said charge request data including charge transfer day, requesting organization, paying organization, and amount of transfer, for charge transfer processing without generating payment slips, said system comprising:
   data input means for inputting said charge request data from requesting organizations;
   transmitting means for transmitting said charge request data from a financial organization;
   a master file storing registered information relating to requesting organizations and paying organizations;
   charge transfer processing means for preparing a charge transfer detailed file which includes, based on said charge request data inputted by said data input means and said information registered in said master file, individual charge request data for each requesting organization and summary data, summarizing the number of transfers and amount of transfer for each type of charge request data; and
   input/output means for displaying, printing and transmitting the data prepared by said charge transfer processing means and for inputting operation,
   wherein said charge transfer data includes:
      transfer slips consolidating for each paying organization individual charge request data classified to the main office, branch offices, and local offices of paying organization;
      initial cost data for each paying organization having information necessary for financial accounting registered in said master file; and
      overall charge transfer data for each paying organization for each day of transfer for each requesting organization.

2. A processing system for charge request data according to claim 1, wherein said master file comprises information as type of charges and information on a receiving organization, as information relating to said requesting organization.

3. A processing system for charge request data according to claim 1, wherein said master file comprises information necessary for preparing transfer slips for a local office, items of account, initial cost data, overall charge transfer data, as information relating to said paying organization.

4. A processing system for charge request data according to claim 1, wherein said charge transfer processing means comprises receiving processing means for performing at least one of error check and record classification of said charge request data.

5. A processing system for charge request data according to claim 1, wherein said charge transfer processing means refers to information relating to the paying organization registered in said master file for said charge request data and performs processing as unsettled temporary payment amount in case the information is related to an organization other than the registered paying organization.

6. A processing system for charge request data for performing transfer processing of a charge requested from a requesting organization to a paying organization without generating payment slips, comprising:
   request data generating means for generating charge request data at least including paying organization data, requesting organization data and requested amount data;
   request output means for outputting said charge request data;
   a master file storing registered data relating to the paying organization and the requesting organization, the data including paying organization code, requesting organization code;
   matching processing means, located within the paying organization, for matching the charge request data received from the requesting organization via a filtering organization with the registered data in the master file of the paying organization, wherein said registered data in the master file is received from the main office, branch offices and local offices which received the service from the requesting organization; and
   payment request data output means for outputting the request data to said paying organization based on a matching result of said matching processing when the request data comply with the data in said master file, and for outputting the request data to a charge transfer detailed history file as an unsettled payment based upon a non-matching result of said matching processing when the request data do not comply with the data in said master file,
   wherein said payment request data output means comprises individual charge data generating means for generating individual charge request data obtained by dividing the request data to each requesting organization based on said matching by said matching processing means and outputs the individual charge request data generated by said individual charge data generating means.

7. A processing system for charge request data according to claim 6, wherein said request data comprises charge transfer day data, and said payment request data output means outputs the charge transfer day data together with said requested amount data.

8. A processing system for charge request data according to claim 6, wherein said payment request data output means comprises summary data generating means for generating summary data, which summarizes number of transfers and amount of transfer for each type of requesting organizations based on said matching by said matching processing means and outputs the summary data generated by said summary data generating means.

* * * * *